Patented Apr. 14, 1931

1,800,223

UNITED STATES PATENT OFFICE

JOSEPH D. McNUTT, OF NEW HAVEN, CONNECTICUT, ASSIGNOR, BY MESNE ASSIGNMENTS, TO WINCHESTER REPEATING ARMS COMPANY, OF NEW HAVEN, CONNECTICUT, A CORPORATION OF DELAWARE

PRIMING MIXTURE

No Drawing.   Application filed September 21, 1928. Serial No. 307,555. REISSUED This invention relates to improvements in priming mixtures for small arms ammunition and more particularly to a non-corrosive priming mixture for rim fire cartridges.

In producing the priming mixture forming the subject matter of my invention, I employ a basic metallic nitrate as an oxygen supplying element, a metallic sulphocyanate as the fuel element and a metallic fulminate as the detonating element. To these ingredients I may add barium nitrate. I am aware that the use of a metal nitrate, a metal sulphocyanate and a metal fulminate together with ground glass or other suitable abrasive has been suggested in non-corrosive rim fire priming mixtures, but prior to my invention I am unaware of any prior non-corrosive priming mixture containing a basic nitrate, alone or in combination with other substances. The basic nitrates, especially of the heavy metals, differ notably from the normal nitrates in their physical as well as their chemical properties. In general they are much less hygroscopic and also denser, both to such a degree that the normal nitrates and the basic nitrates, in particular those of lead, are by no means equivalents of each other as ingredients of priming mixtures. Priming mixtures containing normal lead nitrate Pb (NO$_3$)$_2$ have never been commercially successful owing to the great hygroscopicity of this salt and the resultant instability of priming mixtures containing it.

I have discovered that basic lead nitrate Pb OH.NO$_3$ has relatively so feeble a power of attracting moisture that priming mixtures containing it alone as the oxidizing agent or together with the other well known oxidizers are stable as well as efficient.

A further difficulty with normal lead nitrate Pb(NO$_3$)$_2$ as an ingredient of priming mixtures is the fact that it has a relatively strong acid reaction in the presence of moisture. This together with its hygroscopic nature are the causes of the instability of such mixtures.

The basic nitrate of lead, Pb OH.NO$_3$ in the presence of moisture has a neutral or faintly alkaline reaction, and so, even if damp, it does not exert a decomposing influence on the mercury fulminate or on the fuel as is the case with normal lead nitrate.

Although basic lead nitrate theoretically contains less available oxygen than the normal salt, nevertheless I have discovered it to be a far more efficient oxidizing ingredient of priming mixtures. This I attribute in part to the greater density of the basic salt and in part to the greater availability of its oxygen. In fact, it approaches most nearly in efficiency to potassium chlorate of all the compounds as yet suggested as substitutes for the latter in converting corrosive priming mixtures into non-corrosive priming mixtures.

A suitable priming compound for rim fire use may be formed by mixing the ingredients in the following proportions:—

|  | 1 | 2 |
|---|---|---|
|  | Per cent | Per cent |
| Fulminate of mercury | 35 | 40 |
| Basic lead nitrate | 30 | 12 |
| Lead sulphocyanate | 12 | 10 |
| Ground glass | 22 | 21 |
| Gum | 1 | 1 |
| Barium nitrate |  | 16 |

The proportions of these ingredients may, of course, be varied, depending upon the commercial strength of the ingredients and to meet the requirements of various uses of the compound. The modification of the proportions with eventual omission of the glass for use in center fire primers is within the powers of anyone skilled in the art.

In mixing the ingredients I first weigh out, sieve and mix dry on paper the oxidizers, fuel and glass. The gum is then added in solution and worked in briefly by hand. The wet fulminate is then weighed out and added and the whole mixed for eight minutes by machine and afterwards for five minutes by hand.

The mixture is then formed into individual pellets of the proper size for the individual charges in the customary way by means of a charge plate provided with perforations adapted to mold pellets of the proper size. These pellets are then transferred to empty rim fire cartridge shells in the usual way and forced to distribute themselves into the hollow rims by spinning each shell in the customary machine. The shells are then loaded with powder and bullet in the customary way.

I claim:—

1. A priming mixture comprising basic lead nitrate as an oxidizing ingredient.

2. A priming mixture comprising mercury fulminate, basic lead nitrate and a fuel ingredient.

3. A priming mixture comprising mercury fulminate, basic lead nitrate and lead sulphocyanate.

4. A priming mixture consisting essentially of mercury fulminate, basic lead nitrate, a fuel and an abrasive.

5. A priming mixture comprising basic lead nitrate as its principal oxidizing ingredient, a fuel, and an abrasive.

6. A priming mixture comprising substantially 35 percent mercury fulminate, substantially 30 percent basic lead nitrate, substantially 12 percent lead sulphocyanate and substantially 22 percent ground glass.

7. A priming mixture comprising substantially 40 percent barium nitrate, substantially 12 percent basic lead nitrate, substantially 16 percent barium nitrate, substantially 10 percent lead sulphocyanate and substantially 21 percent ground glass.

In testimony whereof I affix my signature.

JOSEPH D. McNUTT.